(12) United States Patent
Richley

(10) Patent No.: US 9,340,731 B2
(45) Date of Patent: May 17, 2016

(54) PRODUCTION OF FUEL GAS BY PYROLYSIS UTILIZING A HIGH PRESSURE ELECTRIC ARC

(76) Inventor: Edward Anthony Richley, Gaithersburg, MD (US)

( * ) Notice: Subject to any disclaimer, the term of this patent is extended or adjusted under 35 U.S.C. 154(b) by 375 days.

(21) Appl. No.: 13/525,301

(22) Filed: Jun. 16, 2012

(65) Prior Publication Data

US 2013/0333288 A1    Dec. 19, 2013

(51) Int. Cl.
| | |
|---|---|
| *C10B 47/06* | (2006.01) |
| *C10B 47/20* | (2006.01) |
| *C10B 53/02* | (2006.01) |
| *C10K 3/00* | (2006.01) |

(52) U.S. Cl.
CPC .................. *C10B 47/06* (2013.01); *C10B 47/20* (2013.01); *C10B 53/02* (2013.01); *C10K 3/003* (2013.01); *Y02E 50/14* (2013.01)

(58) Field of Classification Search
CPC .................. C10J 2300/1207; C10J 2300/1238
USPC .......................................... 48/197 R, 61, 210
See application file for complete search history.

(56) References Cited

U.S. PATENT DOCUMENTS

| | | |
|---|---|---|
| 1,865,341 A | 6/1932 | Smith |
| 3,622,493 A | 11/1971 | Crusco |
| 5,143,000 A | 9/1992 | Camacho |
| 5,666,891 A | 9/1997 | Titus |
| 6,005,149 A | 12/1999 | Bishop |
| 6,089,169 A | 7/2000 | Comiskey |
| 6,153,158 A | 11/2000 | Flannery |
| 6,173,002 B1 | 1/2001 | Robert |
| 6,222,153 B1 | 4/2001 | Wald |
| 6,630,113 B1 | 10/2003 | Surma |
| 6,971,323 B2 | 12/2005 | Capote |
| 2008/0277265 A1* | 11/2008 | Tsangaris et al. ........ 204/157.15 |
| 2012/0090237 A1* | 4/2012 | Surma et al. ..................... 48/87 |

FOREIGN PATENT DOCUMENTS

JP    2010077260 A  *  4/2010

OTHER PUBLICATIONS

Machine Translation and English Language Abstract of JP 2010-077260A.*
Raizer, Yuri P., "Gas Discharge Physics", Springer-Verlag Berlin, 1991. pp. 315-317.
Dresvin, S.V. (ed), "Physics and Technology of Low-Temperature Plasmas", Iowa State University Press, Ames, 1977. pp. 230,234,236,241,250,266.

* cited by examiner

*Primary Examiner* — Matthew Merkling
(74) *Attorney, Agent, or Firm* — Meagher Emanuel Laks Goldberg & Liao, LLP

(57) ABSTRACT

A system for the production of fuel gas from solid or liquid organic feedstock uses a reentrant structure and a high pressure electric discharge to distinctly separate regions of slow and fast pyrolysis. Efficient re-use of discharge energy sustains the evolution of tar gas, through slow pyrolysis, which forms the feed gas for the discharge without introduction of air. Output is the result of fast pyrolysis and can be optimized to yield a high fraction of hydrogen and low fraction of carbon monoxide.

14 Claims, 7 Drawing Sheets

PRODUCTION OF FUEL GAS BY PYROLYSIS UTILIZING A HIGH PRESSURE ELECTRIC ARC

FIELD OF THE INVENTION

This invention relates to the production of fuel gas from various kinds of organic material. More specifically, the invention relates to the field of devices utilizing a high pressure electric arc to produce fuel gases through pyrolysis of solid or liquid organic material.

DESCRIPTION OF RELATED ART

The production of fuel gas from biomass or municipal waste has a very long history. Fuel gas can be produced by pyrolysis whereby organic material is heated in an environment with insufficient oxygen to allow complete combustion. The pyrolysis usually proceeds in two stages. In the first stage, known as "slow pyrolysis", the temperature of the input material is raised to 400-900 C, at which point some organic compounds are volatilized. These volatile hydrocarbons are then brought to a higher temperature region to undergo "fast pyrolysis" in which they are broken into much smaller compounds such as hydrogen gas ($H_2$) and carbon monoxide (CO). Both of these are useful fuel gases and can be taken as the product of the process. However, often steps are taken to further refine the fuel gas, usually in order to remove carbon and its compounds from the product.

Traditionally, combustion is used to drive the entire pyrolysis process. A relatively small bed of fuel is provided with sufficient air to sustain combustion. This bed is ignited and forms a well-controlled zone of very high temperature. The amount of oxygen present is maintained well below the point at which complete combustion of all the carbon present in the fuel would be consumed. In this manner, a hot bed of incandescent char (>900 C) is present. The residual heat from this high temperature zone serves to heat the incoming air and, more importantly, to heat, via radiation and conduction, a quantity of solid fuel feedstock in a surrounding hopper. The temperature reached in this well-insulated hopper is less than in the localized incandescent char, but sufficient to release volatile components from the fuel (400-900 C). The volatile components, consist of hydrocarbons which are gaseous above 400 C, but of sufficient molecular weight that they would condense into tars at lower temperatures and hence are often referred to as "tar gases". This release of tar gases at a relatively low temperature, with insufficient air for their combustion, comprises the slow pyrolysis process. Most gasification systems, for example Smith U.S. Pat. No. 1,865,341, run these tar gases through the hotter incandescent region in order to decompose them into simpler molecules such as $H_2$ and CO. The higher temperature region thus sustains fast pyrolysis, and often further utilizes the presence of incandescent char in order to chemically reduce $CO_2$ (carbon dioxide) to CO.

In general, the higher temperature fast pyrolysis process decomposes the tar gases into monatomic species and simple ions which subsequently, upon cooling, are most likely to recombine into simple CO and $H_2$ molecules. Formation of binary molecules, such as $H_2$ and CO, require the collision of only three bodies in the gas phase, with little or no activation energy. Higher complexity compounds would require a more unlikely combination of 4 or more reactants in a collision. Similarly, formation of molecules on a solid surface (such as a duct wall) require only two bodies to form a binary molecule, and hence is more likely than formation of larger molecules. Furthermore, subsequent combinations of higher weight compounds from the stable $H_2$ and CO are unlikely if their temperature is lowered sufficiently quickly, due to the activation energies required. Thus, fast pyrolysis followed by rapid cooling provides a means for generating clean fuel which is gaseous at room temperature.

Often, additional refinements are made to the gas composition. For example, water vapor is sometimes added in order to generate CO and $H_2$ via the reaction $C+H_2O \Rightarrow CO+H_2$. Further refinement is possible through the water-gas shift reaction: $CO+H_2O \Rightarrow CO_2+H_2$. $CO_2$ can subsequently be removed through a scrubbing process, yielding a gas rich in $H_2$.

Pyrolysis by combustion has been practiced for many years. Despite its simplicity and convenience, combustion based pyrolysis has several shortcomings. Chief among these is the need to maintain a smoldering fire by introducing a controlled flow of air. This incoming air brings more oxygen into the product gas than would otherwise exist in the feedstock. This oxygen combines with carbon to form CO and $CO_2$ as combustion products which then must be converted and/or scrubbed from the product gas in order to increase its quality, especially if the product gas is to be rich in $H_2$. Introduction of air into the combustion process also brings with it nitrogen, which tends to form undesirable compounds, particularly oxides, in the product gas. Another shortcoming is the inefficiency created by the temperature limitations of the combustion process. The speed and quality of the fast pyrolysis is limited by the temperature attainable by the oxygen-poor combustion. Furthermore, the rate of heat transfer to the surrounding bulk feedstock, which drives slow pyrolysis, is constrained by that same temperature of combustion.

More advanced combustion-based systems have been developed. Bishop (U.S. Pat. No. 6,005,149) describes a continuous combustion-based system for converting organic materials to fuel gas and char. Heat is provided by two burners and an oxygen lance. Fuel and oxygen feeds are needed for the burners, while the oxygen lance is described as being water cooled. The reactor chamber is rotated in order to achieve heat transfer throughout the bed of material being processed. The reactor contains a zone for drying and volatilizing, and a zone for reformation. These two zones are separated only by a retaining weir, and correspond to slow and fast pyrolysis, respectively. The system must contend with the introduction of oxygen in the combustion products of the burners, as well as from the oxygen lance, and makes little effort to recover heat produced by the reformation process. Furthermore, a fuel and oxygen supply is needed in order to operate this system.

The possibility of utilizing a high pressure electric arc for fast pyrolysis has been explored extensively as a means to circumvent the aforementioned shortcomings of combustion. For example, Crusco (U.S. Pat. No. 3,622,493) describes a method for synthesis of acetylene ($C_2H_2$) from various hydrocarbon liquids or gases. The temperatures in a high pressure arc easily reach above 4000K, and temperatures as high as 10,000K are not uncommon. This is substantially higher than the temperatures of 1000-2000K available through combustion and result in a much more thorough decomposition and, in fact, ionization of the atomic species which comprise the feedstock. In the afterglow, directly downstream of the arc itself, rapid quenching and various purification steps result in the production of the desired compounds which are usually simple molecules.

In a related field, an electric arc is utilized for the purpose of treating toxic or municipal waste. In this field there is an additional need for higher temperatures because the feedstock contains non-volatile materials, such as metals and silicates, which can be melted by the arc into a pool of "slag" and which is easily removed after solidification. In this manner, various toxic components, such as heavy metals, can be safely bound into the solid form where they will resist leaching into the ground water. Capote, Menon, Rosin, and Zhou (U.S. Pat. No. 6,971,323) describe such a system and even suggest that the solidified slag be used for various commercial applications such as road construction and building materials (col 9 lines 40-46).

Camacho (U.S. Pat. No. 5,143,000) describes arc-based pyrolysis of refuse which is intended to generate fuel gas. The high temperature attainable with the arc is utilized to both melt inorganic material, as well as to cause fast pyrolysis of the organic components. Camacho further makes use of the residual heat of the arc to pre-heat the bulk of the feedstock, accelerate the pyrolysis process, and improve efficiency. The arc is described as either transferred or non-transferred, but only a non-transferred arc is depicted and with an unspecified feed gas supply. In fact, the kinetic energy of the stream from the gas-fed plasma arc torch is used to impart a mixing action to the molten pool of slag, suggesting that a non-transferred arc is preferred. Injection of steam is described for the further conversion of carbon to useful fuel gas.

Although Camacho teaches that the residual arc heat can be captured by the insulated furnace walls to effect slow pyrolysis in the bulk, the regions of fast and slow pyrolysis are not well defined or demarcated, nor is mechanism disclosed for forcing the volatilized products of slow pyrolysis to subsequently undergo fast pyrolysis. Rather, the gases emanating from the bulk are taken as fuel gas after pyrolysis at a relatively low temperature. Furthermore, the recommendation of a gas-fed plasma torch leaves open the possibility that the feed gas may introduce undesirable species into the product gas.

Titus, Cohn, and Surma (U.S. Pat. No. 5,666,891) describe a combination of plasma and Joule heating for treatment of waste and recovery of fuel gas. The addition of $H_2$ is recommended for the conversion of carbon to fuel products. The plasma as described is generated by a transferred arc, so there is no introduction of a torch gas. The arc is described as contributing to fast pyrolysis, in order to generate a high purity fuel gas.

As Titus et al are concerned with the treatment of municipal solid waste (MSW), much of their focus is on treatment of slag containing glass and metals. In fact, their use of Joule heating is primarily to keep this pool of slag molten. The arc is present primarily for feed rate enhancement, by pre-heating the incoming feed, while the Joule heating is used to ensure complete dissolution and mixing of the mixture (col 13 lines 15-45). This is due to the fact that one object of the invention is to convert MSW into useful materials by stabilizing toxic components. The use of a different feedstock which did not form a well-behaved melt would not be appropriate for this system. Furthermore, although the arc is described as contributing to fast pyrolysis, it is not arranged so as to force volatile components to pass through it in any consistent manner. There is no well-defined boundary between the arc and the feedstock, nor is the heat of the product gas recovered in any useful manner.

Comiskey (U.S. Pat. No. 6,089,169) describes a very sophisticated system for conversion of waste into useful materials and fuel gas. In this system, both a starved air burner as well as several nitrogen-fed non-transferred plasma torches are utilized. A rotary kiln is outfitted with both a burner and plasma gun so as to cause slow pyrolysis in a hopper of feed stock. Volatilized gases from the hopper then pass through a chamber containing a second plasma arc generator which accomplishes fast pyrolysis. $H_2O$ is added in order to control the conversion of carbon to CO while minimizing the production of $CO_2$. A control loop monitors the amount of $CO_2$ in the output and adjusts the upstream injection of $H_2O$ accordingly. Heat exchangers are used to cool the gas and allow recombination into simple molecules. The gas is then processed in order to improve its quality. A sulfur recovery stage is described, followed by means to remove $CO_2$ and hydrogen sulfide ($H_2S$). The gas is then passed through a set of molecular sieves to separate the inert gas, $H_2$, and CO.

One disadvantage of the system of Comiskey is the use of a starved-air burner. This will introduce unwanted $O_2$ and $N_2$ into the system. Likewise, the non-transferred arc torches require injection of $N_2$. Much of the downstream processing is based on the removal of these unwanted gases. Furthermore, although heat exchangers are utilized for the rapid quenching of the gas stream, there is no disclosure of any means for utilizing the heat so recovered in order to enhance the remainder of the process.

Flannery and Kujawa (U.S. Pat. No. 6,153,158) teach the use of an inductively coupled plasma (ICP) for the purpose of incinerating and oxidizing effluents from a waste treatment apparatus. The system introduces oxygen into the stream as it enters an afterburner in which an ICP is maintained. The extremely high temperatures within this arc cause fast pyrolysis and subsequent oxidation of the waste products. As the goal is oxidation, the production of fuel gas is not disclosed. By the use of an ICP, no mass is added to the stream beyond what is introduced by the oxygen source. In this manner, energy is added directly to the effluent, without an intermediate combustion process and an undesirable introduction of combustion products into the stream (col 4 lines 44-48). A cooling mechanism is disclosed, but with no use being made of the residual heat lost thereto. In fact, no energy recovery of any type is disclosed. Furthermore, this system is intended to completely oxidize its products (Col 4 lines 18-20).

Robert (U.S. Pat. No. 6,173,002) discloses an arc-based system for waste processing and recovery of metals. The primary purpose of this system is to process powder, liquid, slurry, or gaseous waste of the type which emanates from an electric arc furnace during the production of steel. Recovery of $H_2$, carbon black, hydrochloric acid (HCl), and various metals for industrial use are disclosed as objectives. An electric arc is formed in a stream of injected primary gas, which is then mixed with a carrier gas containing the waste in a fluidized form. After this high temperature mixing, a third gas is injected for either oxidation of reduction of the stream depending on the desired products. Robert teaches that thermal efficiency can be gained by not cooling the arc electrodes. Robert also teaches that the primary and carrier gases can be $H_2$ or a hydrocarbon gas, and that the heat of the output gas can be recovered for preheating the injected gases.

Although Robert teaches fuel gas production as well as residual heat recovery, the primary concern is with recovery of industrial materials. The injected gases are taught to possibly be various fuel gases themselves, such as natural gas (primarily methane, $CH_4$) or $H_2$. No indication is given that there could be a net energy gain from the system, nor would it be expected since the feed stocks considered are limited to industrial effluents or toxic wastes.

Wald (U.S. Pat. No. 6,222,153) describes an incineration method using a pulsed plasma. The system is intended for incineration of fluid or fluidizable materials. The plasma is created in an injector which forms a high velocity jet which is designed to create fluid instabilities in the feedstock fluid.

This strong mixing, as well as the higher temperatures attainable with the pulsed plasma, allow the dominant heat transfer method to be radiative. Wald teaches that the plasma is to be cooled by ablation of the walls of the chamber surrounding the plasma jet, which can also comprise the feedstock. This ablation also serves to increase the heated mass of the jet and to so increase its ability to transfer heat to the fluidized feedstock. Wald further teaches that water cooling can be applied to reduce the temperature of the plasma injector, with no disclosure of a means for recovering the residual heat. Although $H_2$ is cited as one of the product gases, no indication is made that the system is optimized for fuel gas production or energy efficiency. In fact, the stated purposes is the decomposition of hazardous chemicals. The only example given is for a liquid feedstock consisting of 1,2 dichloroethane which is presumably introduced under pressure. Furthermore, the use of a pulsed plasma is specifically taught for the enhancement of radiation at wavelengths sufficiently short to be effective at breaking halogen-carbon bonds as are found in many toxic materials. Thus, the dissociation mechanism is taught to be preferably radiative and not thermal.

Surma (U.S. Pat. No. 6,630,113) describes a system for the treatment of waste which can optionally produce fuel gas and which, with the addition of auxiliary fuel, can be self-powered. The system uses a combination of Joule heating and transferred arcs. Surma further teaches the use of a secondary arc positioned in the stream of effluent gases of a primary furnace for the specific purpose of causing fast pyrolysis in that stream. Although the efficiency gain from locating this secondary arc proximal to the furnace is taught, there is no disclosure of a means for extracting the residual heat from this secondary arc-based fast pyrolysis stage for use back in the slow pyrolysis stage.

Systems for fuel gas production based on combustion demonstrate that sufficient chemical energy is available in the feedstock for a gasification system to be self-sustaining. Although advantageous for their simplicity, the shortcoming of combustion-based systems is the low quality of product gases, due to the limited temperatures available for fast pyrolysis. Prior art includes the use of the electric arc to raise the temperature, but these arcs are generally of the free burning type, for which the processing of feed gas is inconsistent as the gas is not forced to travel through the arc core. As such, the prior art neglects to fully separate fast from slow pyrolysis, nor does it describe any means to substantially recover residual heat from the arc in order to sustain slow pyrolysis and the corresponding generation of tar gases.

SUMMARY OF THE INVENTION

The present invention accomplishes efficient conversion of organic material to fuel gases by the use of a high pressure electric arc in which the feed gas comprises primarily the tar gases generated by slow pyrolysis. The arc thus enables extremely fast pyrolysis to occur without introduction of unwanted feed gas components. It is a further feature of this invention to utilize the heat generated by the high pressure arc, both sensible and reactive, through the use of a heat exchanger, in order to drive the slow pyrolysis which, in turn, generates the tar gases which feed the arc. Electric current to supply the arc can be taken from an electric generator powered by the product gas. Excess available energy can be either stored in the form of product gas, or utilized from the generator output along with the arc power.

By careful control of the admission of feedstock through air-tight rotary valves or a helical feeder, sufficient pressure can be built up in the feedstock chamber to drive gases through the entire process. The arc will add thermal energy which can be converted to directed energy by constraining the flow. The increase in speed so obtained can be used to control the residence time of the arc effluent in the heat exchanger so as to mitigate the formation of undesirable tri-atomic and larger species. In addition, at a sufficiently high arc current, the Lorentz force can be used to further enhance the flow.

Chemical refinement of the product gas can be accomplished by the addition of steam, generated from input water heated by the arc output. Traditional $CO_2$ scrubbing can be performed on the product gas at the system's output.

Other embodiments can be formed in order to further enhance thermal efficiency. For example, in order to shorten path lengths between the arc and the feedstock chamber, multiple arcs and chambers can be configured in a looped cascade arrangement in which each arc takes its feed from a previous feedstock chamber, and delivers its heat output to the next. The arcs are thus distributed throughout the feedstock so as to more uniformly and directly draw their feed gas and transfer their heat energy.

DETAILED DESCRIPTION OF THE INVENTION

The present invention achieves efficiency by careful management of both the feed gas flow through an electric arc, as well as the heat generated by the arc. In particular, a reentrant chamber in which the electric arc is thermally connected to a mass of feed stock allows radiation and conduction from the extremely high temperature arc to be utilized directly for fast pyrolysis, and indirectly for slow pyrolysis and the formation of tar gases. The generated tar gases are then used as the feed gas for the arc. The discharge module is arranged so that substantially all feed gas passes through the hottest part of the arc, called the "arc column". At its exit, the arc effluent consists primarily of monatomic species and simple ions which can transfer their sensible heat to the walls of tubing comprising a heat exchanger which is thermally connected to the same mass of feed stock. Additionally, the formation of the desirable diatomic fuel products in the gas phase of the arc effluent will also deliver excess reactive energy to the walls of the same heat exchanger.

Figure 1:
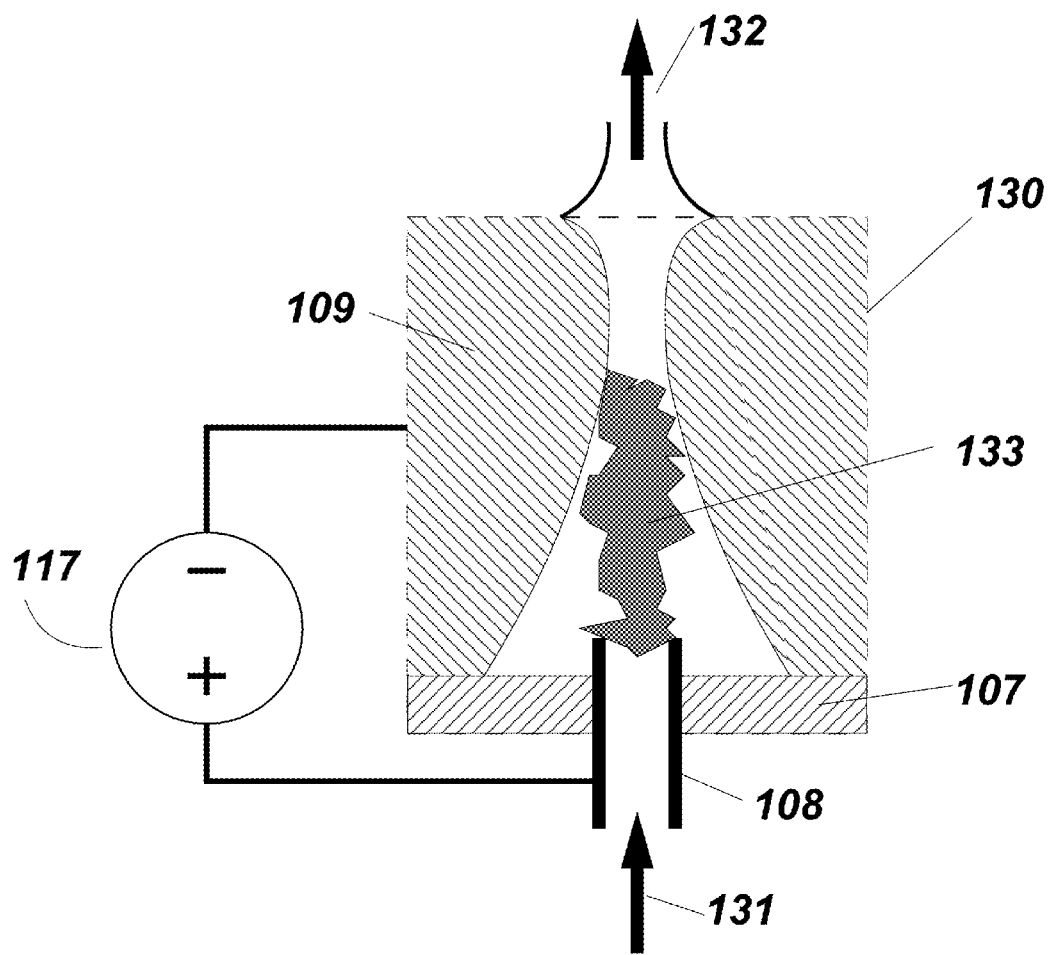
FIG. 1 shows an example of a high pressure electric discharge module 130, with electric arc, 133, driven by electric power source 117, and sustained in a constricted nozzle formed in electrode 109. Insulating layer 107 separates electrode 109 from hollow electrode 108. Feed gas supply is shown at inlet 131, and arc effluent is shown at exit 132.

FIG. 1 shows a cross-sectional diagram of high pressure non-transferred discharge module, 130, as employed in one embodiment of the present invention. High pressure electric arc 133 is struck between hollow electrode 108 and the conductive walls of electrode 109. Electrode 109 is formed into a constricted nozzle. Electrical power is delivered by source 117. Electric arc 133 in this configuration is commonly known as a wall-stabilized arc, a plasma arc torch, or an arc plasmatron. Other examples of geometries for arc plasmatrons are given in "Gas Discharge Physics" by Yuri P. Raizer, Springer-Verlag 1991 p. 315 and in "Physics and Technology of Low-Temperature Plasmas", ed. by S. Dresvin, Iowa State University Press, 1977, pp. 241, 250, 266.

Electrodes 108 and 109 are shown as anode and cathode, respectively, but may in fact exchange roles. Furthermore, electric power source 117 may preferably be a source of alternating current at a suitable frequency. These choices of polarity and frequency would be made in order to minimize electrode erosion under normal operating conditions. Insulator 107 is needed in order to maintain nozzle flow while insulating the electrodes from each other.

In practice, electrodes 109 and 108 will be subjected to extremely high temperatures and current densities. Refractory conductors, such as Tungsten and graphite, would be chosen for these components.

Inlet gas, at 131, is passed through hollow electrode 108 and forms the parent gas for high pressure electric arc 133. Due to the constriction in the downstream electrode 109, substantially all feed gas passes through or very near to the arc column. The arc column is where the electrical current actually flows and, hence, dissipates its energy directly to the highly ionized gas. As a result, the arc column is the hottest and most luminous part of the discharge. Ideally, all feed gas will pass within or sufficiently close to the column that complete dissociation of the tar gas will result. Arc effluent, at 132 will then preferably be comprised of atomic and ionic species, as well as free electrons, from the afterglow of arc 133.

As is well known in the art of gas dynamics, the thermal energy added by the high pressure arc will be converted to directed momentum to the arc effluent at 132, provided that a pressure difference is maintained between inlet flow 131 and outlet flow at 132. Since the temperature increases as gas passes through the column, and since complete dissociation is preferably achieved, the gas density at the arc exit 123 will be substantially lower than at its inlet 131. Thus, in order to conserve mass flow rate, the gas velocity must substantially increase. This added momentum, further enhanced by the Lorentz force of the arc, results in a high velocity gas of relatively low density at nozzle exit 132.

The high velocity afterglow not only has a high temperature from having been generated in a high pressure electric arc, but also contains significant chemical potential. Thus, both sensible heat as well as chemical energy are sent from discharge module 130 with significant velocity. Recovery of that heat can occur at some distance from discharge module 130 as interaction with duct walls takes place. The reduced density of the exit gas serves to prolong that heat recovery by reducing the rates of the exothermic reactions which form molecules.

Discharge module 130 could also be implemented so as to incorporate an inductively coupled plasma, in place of arc 133, as the high pressure discharge. As is well known in the art (see, for example, "Gas Discharge Physics" by Yuri P. Raizer, Springer-Verlag 1991 pp. 316-317 and "Physics and Technology of Low-Temperature Plasmas", ed. S. Dresvin, Iowa State University Press, 1977, pp. 230, 234, 236), elements 108 and 109 would not need to be electrically conductive, and a suitable induction coil would be needed to surround the nozzle formed in element 109, along with an initiation mechanism. Electric power source 117 would be replaced by a suitable source of high frequency current, and would be connected to the induction coil. This alternate embodiment would have the advantage of eliminating electrode erosion, at the cost of added complexity and reduced electrical efficiency. The functionality of module 130 in the present invention would remain unchanged with this choice.

Electrode 109 will be subjected to intense radiation, as well as sensible heat via conduction, from arc 133 and so will attain an elevated temperature with respect to its surroundings. Thus, module 130 serves not only as a means for projecting energy downstream of exit 132, but can also serve as a heat source, itself. Recovery and utilization of all of these forms of energy is an essential feature of a system according to the present invention.

Figure 2:
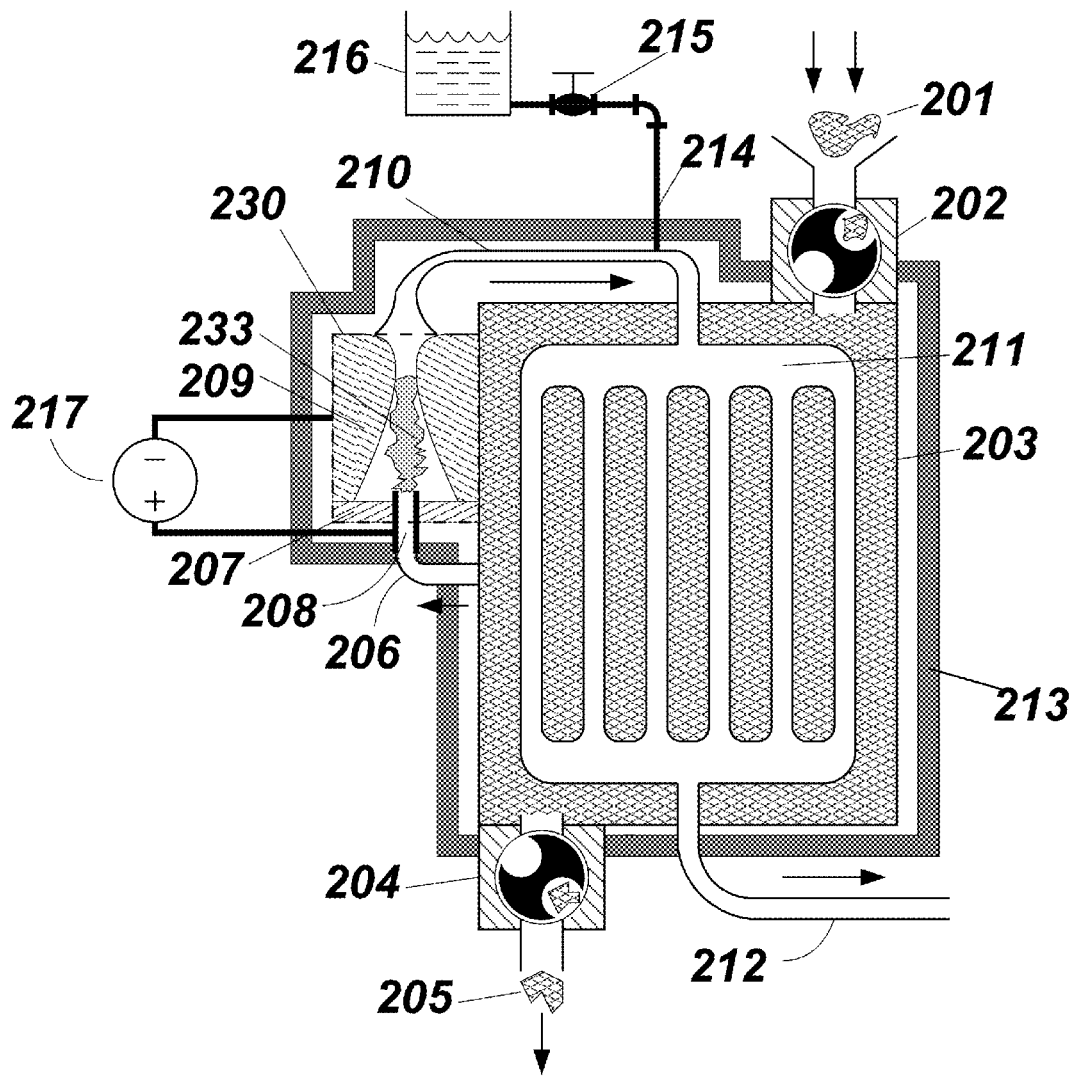
FIG. 2 shows a representative system for fuel gas production according to the present invention with input feedstock 201, rotary valves 202 and 204, feedstock chamber 203, high pressure arc module 230, heat exchanger 211, and char byproduct 205.

FIG. 2 shows an embodiment of a system for production of fuel gas according to the present invention. Organic feedstock 201 enters chamber 203 rotary valve 202. As is well known in the art of materials processing, rotary valve 202 serves to admit small quantities of feedstock into chamber 203 without forming a direct path to atmospheric air. Chamber 203 contains heat exchanger 211 which is connected through duct 210 to the exit port of discharge module 230. Inlet port 208 of discharge module 230 is connected via duct 206 to feedstock chamber 203. Insulating layer 213 surrounds both chamber 203 and discharge module 230.

Heat exchanger 211 allows for the free flow of hot gas from duct 210, throughout its interior passages, and on to duct 212 which forms the output of the system. Walls of heat exchanger 211 are substantially impermeable to mass transfer, while allowing for substantial thermal communication with its surroundings.

In operation, discharge module 230 is energized by electric power source 217 to form arc 233. Feed gas for arc 233 is driven or drawn through duct 206 from feedstock chamber 203. In chamber 203, slow pyrolysis of the feedstock material contained therein proceeds as its temperature is raised by both direct contact with discharge module 230 as well as from the heat projected from its effluent, as described above, via heat exchanger 211. Preferably, the temperature maintained in chamber 203 is between 400 C and 900 C.

Tar gas from slow pyrolysis of feedstock material in chamber 203 comprises the feed gas of arc 233, substantially without unwanted introduction of atmospheric components. Evolution of tar gas from slow pyrolysis in chamber 203 creates a positive pressure which drives the gas out duct 206 and toward arc inlet 208. As described above with regard to FIG. 1, arc 233 not only heats and accelerates the tar gas, but also decomposes it, through fast pyrolysis, into monatomic species, neutral and ionized, along with free electrons. Residence time in discharge module 230 can be very short yet still achieve complete dissociation due to the extremely high temperatures attainable by the arc. The arc temperature is typically 10,000K, which easily exceeds that attainable by combustion but without the need for introduction of air and its undesirable components, $N_2$ and $O_2$. The monatomic species and simple ions so created will recombine most favorably into diatomic gases while cooling in heat exchanger 211, since gas entering heat exchanger 211 at duct 210 will be substantially cooled to the temperature of chamber 203 by the time it leaves the system at duct 212.

The reentrant structure formed by chamber 203, duct 206, discharge module 230, duct 210, and heat exchanger 211, allows for constructive re-use of the energy delivered to arc 233 from electric power source 217. As the arc effluent is cooled in heat exchanger 211, so the feedstock is heated. Both sensible heat and reactive energy contribute to this transfer of energy to the feedstock. Insulation layer 213 serves to further energy re-use by reducing unwanted losses to the ambient.

As the slow pyrolysis proceeds in chamber 203, feedstock material loses its volatile components and is gradually converted to char. Char, being substantially carbon, becomes a waste product after a sufficient residence time in chamber 203. Shown diagrammatically as having proceeded to the bottom of chamber 203, char is removed from the system by rotary valve 204. As a byproduct of fuel gas production, char can be used for various industrial or agricultural applications, or used as fuel in a conventional combustion process.

Preferably, the intensity of arc 233 is controlled by adjustment of electric current from source 217 so as to match the requirements for slow pyrolysis in chamber 203. The relative size of chamber 203 in comparison to the size of discharge module 230 is chosen to allow efficient re-use of energy from the arc effluent. Using a silica-based high temperature insulating material, such as Refractory Specialties, Inc.'s "Microcell", for insulating layer 213, thermal conductivities of the order of 0.1 W/M/C can be obtained. Maintenance of a chamber temperature of 900 C over an ambient of 0 C with a thickness of layer 213 of 20 cm yields a loss of approximately 450 W/M². A 2 kW arc of 40V at 50 A would be able to sustain a drum-shaped feedstock chamber at 900 C with a diameter and height of about 1M.

Also shown in FIG. 2 are water reservoir 216, valve 215, and injection pipe 214. Although shown to be connected at duct 210, alternate entry points may be found to be preferable. Controlled introduction of water, via modulation of valve 215, serves to enhance the composition of exit gas at duct 212 by use of the water-gas shift reaction in which carbon and CO are converted to $H_2$ and $CO_2$. Thus, the composition of exit gas may be adjusted to eliminate carbon monoxide and soot.

Further processing and scrubbing of exit gas downstream of duct 212 may be performed by means well known in the art. Amine solutions, for example, can be used to remove $CO_2$. The resulting fuel gas can then be used for various purposes, including generation of electricity. A portion of electricity so generated can be used to implement electric power source 217 so that the system is self-sustaining.

Figure 3:
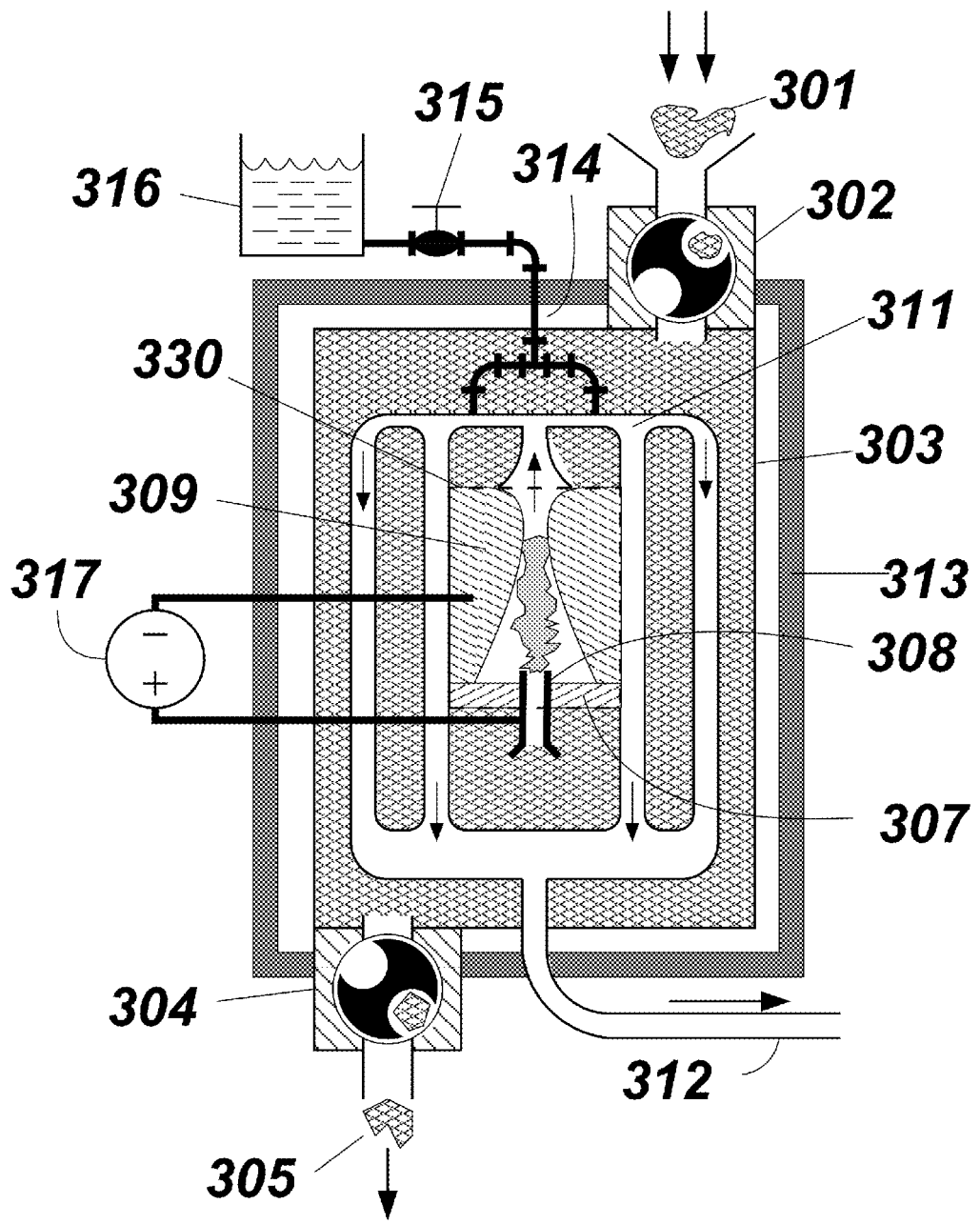
FIG. 3 shows an embodiment of the present invention in which high pressure arc module 330 is embedded in feedstock chamber 303, along with heat exchanger 311.

FIG. 3 shows an alternate embodiment for which energy re-use is further enhanced. In this embodiment, discharge module 330 is embedded within feedstock chamber 303. This arrangement serves to completely capture heat dissipated by discharge module 330, by virtue of its location, and also manages to shorten the paths of both feed gas and effluent from discharge module 330. Hotter exit gas will better deposit its energy into the central portion of feedstock in chamber 303, while tar gas feeding into hollow electrode 308 will be hotter and thus more decomposed than if the inlet and exit ducts were longer. Similar to the system shown in FIG. 2, water injected from reservoir 316 is pre-heated by the extension of pipe 314 into chamber 303.

Figure 4:
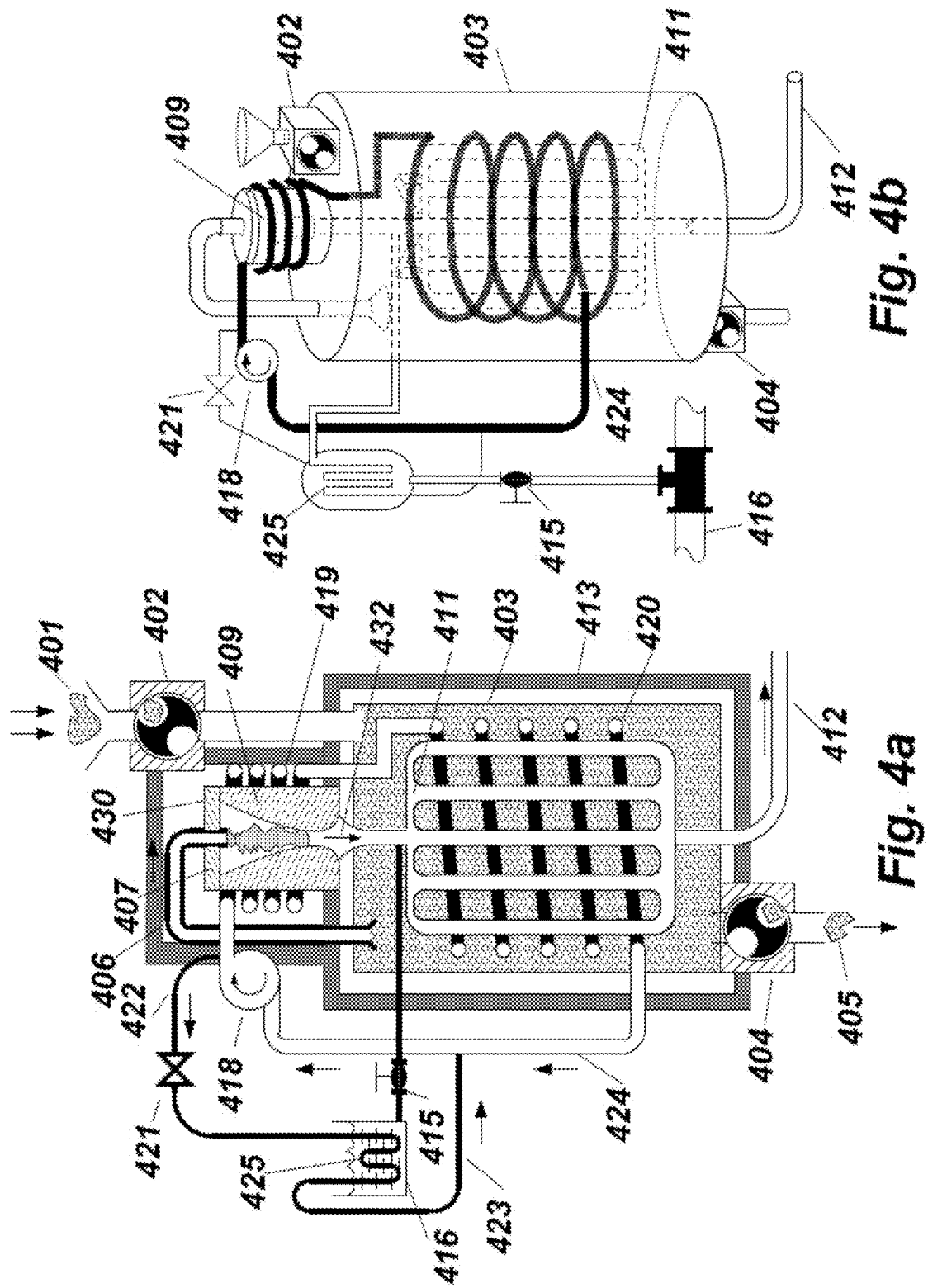
FIGS. 4a and 4b show an alternate embodiment in which high pressure arc module 430 is located adjacent to feedstock chamber 403, and thermally coupled thereto by heat transfer coils 419 and 420, driven by recirculating pump 418.

The placement of discharge module 330 in FIG. 3 is thermally advantageous, but inconvenient should access be required for maintenance operations, such as electrode replacement. FIG. 4a shows an alternate embodiment in which access to discharge module 430 is facilitated, while the path of arc effluent in exit duct 432 is kept very short. In this embodiment, a recirculating heat transfer fluid is driven through coil 419, coil 420, return pipe 424 via pump 418. The heat transfer fluid may be of the molten salt variety, such as MS-1 from Dynalene, Inc. Alternately, in order to better accommodate the expected temperatures, a substantially inert gas, such as nitrogen, may be used if operated at sufficient density and flow rate. This subsystem increases the thermal coupling between discharge module 430 and feedstock chamber 403 to compensate for their adjacent placement. Inlet duct 406 to discharge module 430 passes inside of insulating layer 413 so as to maintain a suitable temperature to prevent condensation of the tar gas within.

Also shown in FIG. 4a is an auxiliary path for heat exchange fluid via pipe 422, valve 421, heat exchange coil 425, and pipe 423. This path pre-heats water in reservoir 416 for its application via valve 415 into the output stream of arc module 430 for adjustment of its chemical composition as described earlier.

FIG. 4b shows a pictorial representation of the system shown in FIG. 4a, with insulating layer 413 has been removed for clarity. FIG. 4b shows that reservoir 416 may also take the form of a supply pipe.

Figure 5:
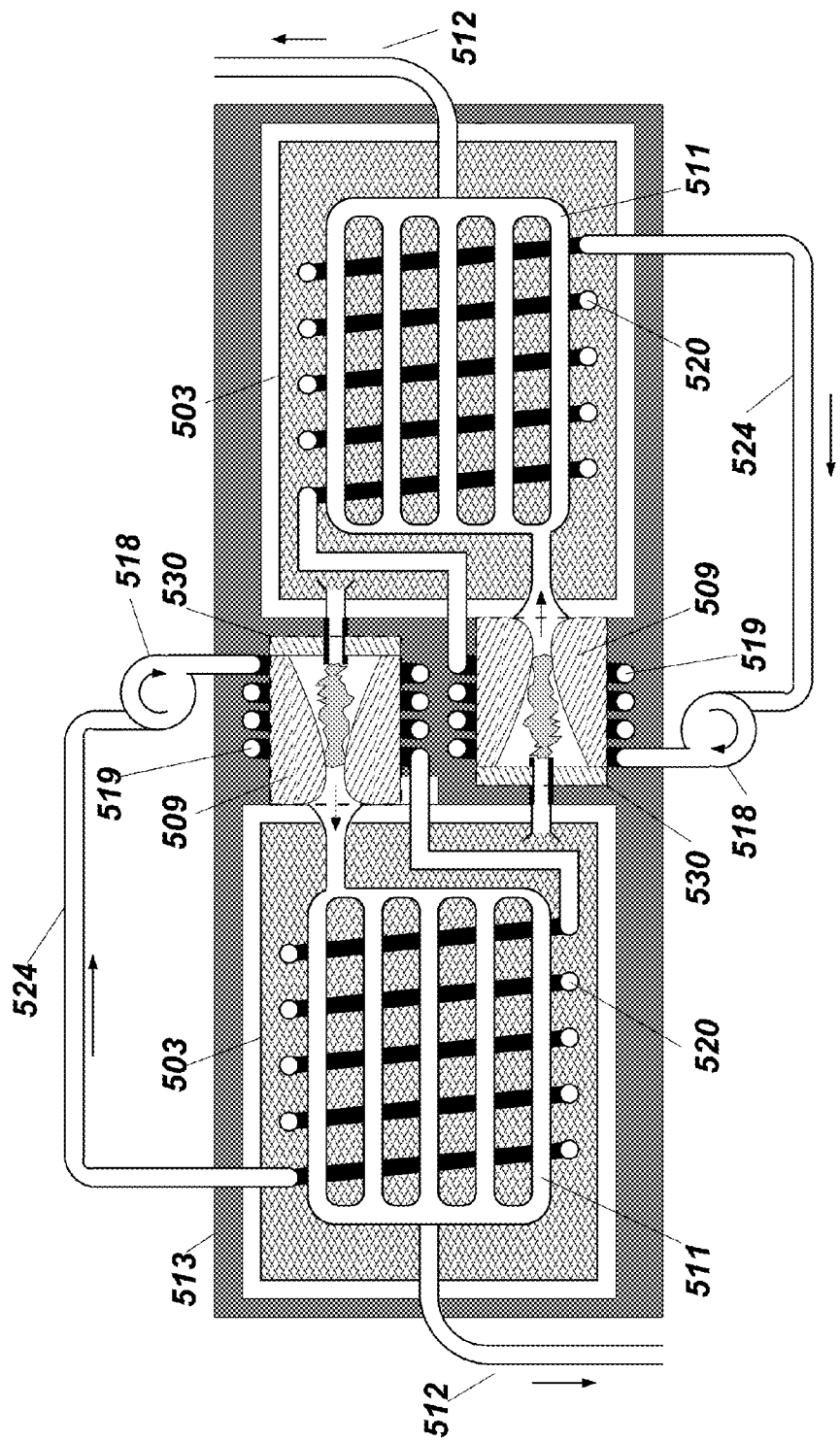
FIG. 5 shows an embodiment in which two feedstock chambers 503 are cross-connected with two high pressure arc modules 530 so as to shorten the path lengths for both arc feed gas and arc effluent gas.

In order to shorten the critical inlet and exit paths while providing accessibility to discharge modules, the alternate embodiment of FIG. 5 can be used. In this embodiment, two feedstock chambers 503 are cross-connected with two discharge modules 530 so that tar gas and arc effluent each travel only a short distance to and from a discharge module. Heat exchange fluid recirculating in coils 519, coils 520, and pipes 524 via pumps 518 further the thermal connection between arc modules 530 and feedstock chambers 503. Similarly, several chambers can be arranged sequentially with more discharge modules to make a ring arrangement with each module taking feed gas from a previous chamber, while delivering its effluent to the next.

Figure 6:
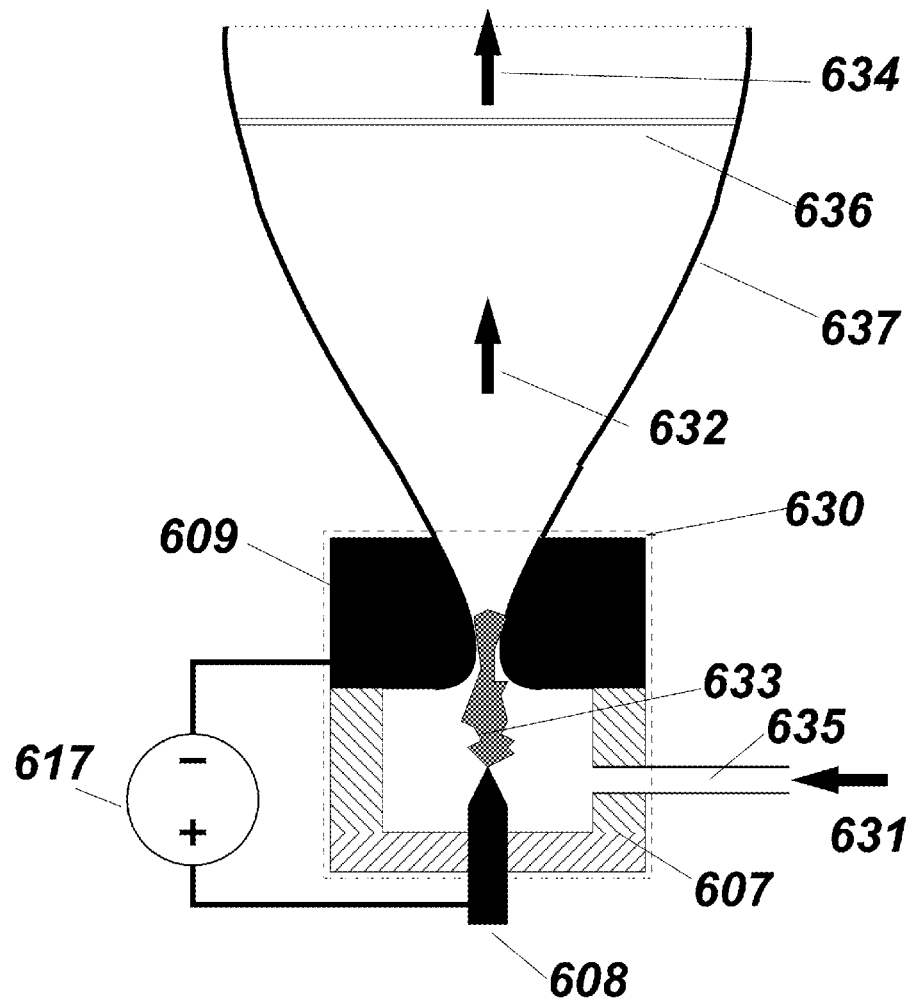
FIG. 6 shows an alternate embodiment of discharge module 630 in which annular electrode 609 is fitted to diverging nozzle 637. Flow becomes supersonic downstream of electrode 609 at 632, and subsequently becomes subsonic at 634 after shock 636.

An alternate embodiment of a discharge module is shown in FIG. 6. In this embodiment, feed gas 631 passes through feed tube 635 and enters a chamber formed by insulating walls 607 between electrodes 608 and 609. Electrode 609 is annular, and shaped with a converging-diverging profile. Electrode 609 is attached to diverging nozzle 637. In operation, feed gas 631 is heated by electric arc 633 and forced through the throat of electrode 609 after which it expands in nozzle 637. Annular electrode 609 and diverging nozzle 637 together form a converging-diverging, or de Laval nozzle. As will be recognized by those skilled in the art of gas dynamics, with sufficient flow rate of feed gas supplied at 631, a de Laval nozzle arranged with sufficient thermal energy added by arc 633 will lead to supersonic flow at point 632, downstream of the throat of electrode 609.

In this configuration, discharge module 630 resembles an arcjet thruster of a type used in some spaceflight applications. Unlike the arcjet, impulse or thrust are not the objective. Rather, the purpose of the configuration of FIG. 6 is to efficiently transfer arc energy downstream. In operation, flow at 632, being supersonic, has a very high speed, but a reduced temperature and density when compared to its subsonic counterpart at 132 in FIG. 1. Thus, its energy loss rate will be lower as the flow travels to where its energy is to be deposited. In this supersonic region, reactions rates are low since concentration, temperature and residence time are low. Thus, little energy is lost in the expansion region 632.

Farther downstream, at 634, pressure is such that a shock will form at 636. As the arc effluent passes through the shock, temperature and density rise, while speed decreases. Thus, conditions after the shock are much more favorable for both the exothermic recombination reactions and conductive transfer. As long as the pressure differential across the discharge module can be maintained at a level sufficient to generate supersonic effluent speeds, the subsequent transition to subsonic flow, farther downstream in the form of a shock, will serve to efficiently transfer both sensible heat and reactive energy far from the discharge module. After that point, formation of the desirable fuel gases proceeds as in the other embodiments.

Figure 7:
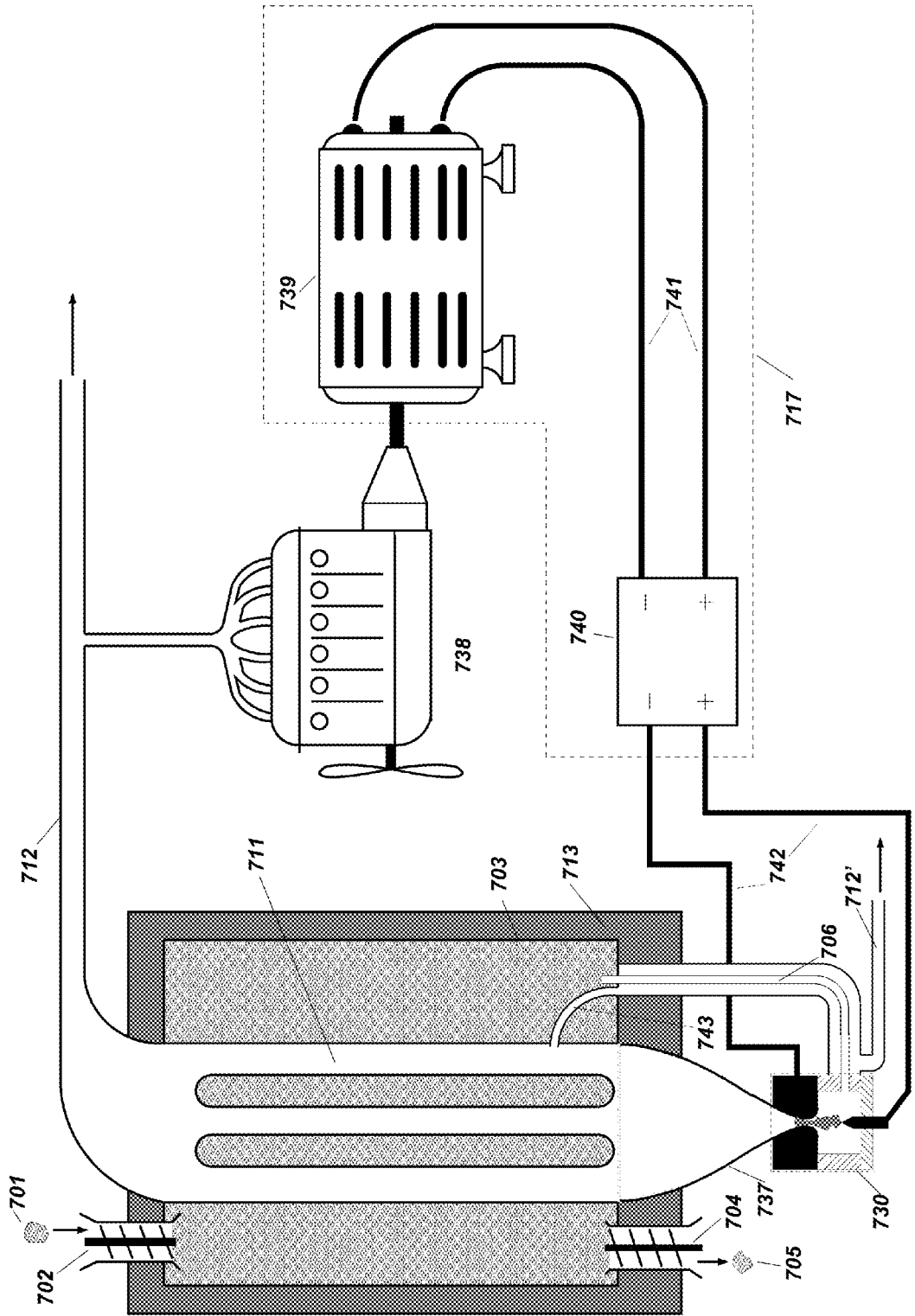
FIG. 7 shows an alternate embodiment of a system according to the invention in which supersonic flow in diverging nozzle 737 is utilized to transfer energy from discharge module 730 to feedstock chamber 703. Internal combustion engine 738 drives electric generator 739 which produces power for discharge module 730 through the use of power converter 740.

FIG. 7 shows utilization of the embodiment of FIG. 6. Supersonic discharge module 730 is connected to heat exchanger 711 through diverging nozzle 737. In this embodiment, feed screw 702 admits feedstock 701 to feedstock chamber 703, while feed screw 704 removes char 705. Tar gas is carried through duct 706 to discharge module 730. Duct 706 is maintained at proper temperature to prevent condensation of tar gas by taking hot product gas with duct 743 and running it over duct 706. Product gas is taken out at 712 and 712' for use or storage.

In addition to storage, some fraction of product gas is used to run internal combustion engine 738. Electric generator 739 is driven by internal combustion engine 738 to produce electric current in lines 741. Power converter 740 takes input power from lines 741 and produces proper voltage and current control for operation of discharge module 730. Electrical connection between power converter 740 and discharge module 730 is made through lines 742. The system is thus self-sustaining, and any surplus fuel or electrical power can be used for other purposes.

It should be understood that numerous changes in details of construction and the combination and arrangement of elements and materials may be resorted to without departing from the true spirit and scope of the invention as hereinafter claimed.

The invention claimed is:

1. A system for production of fuel gas from organic feedstock held in a chamber, the system comprising:
   a heat exchanger having substantial thermal communication with said chamber; and
   an electric discharge module disposed in a path of fluidic communication from said chamber to said heat exchanger, the electric discharge module having an arc generating device capable of generating an arc column wherein a substantial portion of feed gas from said chamber is configured to intersect a substantial portion of the volume of space coincident with that of the arc column,
   wherein the system is configured to convey tar gas generated within said chamber to said electric discharge module mounted external to said chamber, and configured to convey at least a portion of arc effluent generated by said electric discharge module to said heat exchanger, wherein said heat exchanger is mounted internal to said chamber.

2. The system according to claim 1 wherein effluent from said discharge module is fed to said heat exchanger.

3. A system for production of fuel gas from organic feedstock, the system comprising:
   a chamber;
   a heat exchanger;
   an electrode comprising at least one hole extending from a first opening on a first surface of the electrode to a second opening on a second surface of the electrode;
   a first duct configured to couple, either directly or through one or more intervening elements, the chamber and the electrode;
   a second duct configured to couple, either directly or through one or more intervening elements, the electrode and the heat exchanger; and
   wherein the first duct or intervening element is coupled to the electrode such that substantially all feed gas from the chamber that enters the first duct is passed through the at least one hole in the electrode.

4. The system according to claim 3 further comprising a diverging nozzle coupled between said electrode and said heat exchanger, and wherein said electrode is annular and shaped with a converging-diverging profile.

5. The system according to claim 4 wherein said electrode and said diverging nozzle together form a de Laval nozzle.

6. The system according to claim 4 adapted so that, in operation, feed gas is heated and forced through a throat of said electrode after which it expands in said diverging nozzle.

7. The system according to claim 1 wherein:
   said heat exchanger is comprised of interior passages conducive to fluidic transport along a flow direction;
   said interior passages are bounded by walls; and
   said walls are impermeable to mass flow transverse to said flow direction.

8. The system according to claim 1 wherein:
   said electric discharge module comprises at least one electrode of annular construction.

9. The system according to claim 1 wherein:
   said electric discharge module comprises at least one electrode formed into a constricted nozzle.

10. The system according to claim 1 wherein:
    said electric discharge module is coupled to said heat exchanger through a nozzle.

11. The system according to claim 3 wherein said heat exchanger is mounted internal to said chamber.

12. A system for production of fuel gas from organic feedstock, the system comprising:
    a chamber;
    a heat exchanger;
    an inductively coupled plasma generator comprising a coil having a length in an axial direction, a first end, and a second end located at an opposite end of the coil along the axial direction;
    a first duct configured to couple, either directly or through one or more intervening elements, the chamber and the inductively coupled plasma generator;
    a second duct configured to couple, either directly or through one or more intervening elements, the inductively coupled plasma generator and the heat exchanger; and
    wherein the first duct is coupled directly to the first end of the inductively coupled plasma generator and the second duct is coupled directly to the second end of the inductively coupled plasma generator.

13. The system of claim 3, wherein the first duct or intervening elements directly connects to the first surface of the electrode,
    and the second duct or intervening elements directly connect to the second surface of the electrode.

14. The system of claim 3, wherein the heat exchanger is in a path of fluidic communication with the electrode and the chamber, and wherein a portion of the path from the chamber to the heat exchanger extends from the first opening, through the at least one hole in the electrode, to the second opening.

* * * * *